(12) United States Patent
Fujita et al.

(10) Patent No.: US 12,077,073 B2
(45) Date of Patent: Sep. 3, 2024

(54) SEAT SUSPENSION MECHANISM

(71) Applicant: DELTA KOGYO CO., LTD., Hiroshima (JP)

(72) Inventors: Etsunori Fujita, Hiroshima (JP); Ryuji Kuwano, Hiroshima (JP); Soichi Makita, Hiroshima (JP)

(73) Assignee: DELTA KOGYO CO., LTD., Aki-gun (JP)

( * ) Notice: Subject to any disclaimer, the term of this patent is extended or adjusted under 35 U.S.C. 154(b) by 319 days.

(21) Appl. No.: 17/771,161

(22) PCT Filed: Oct. 22, 2020

(86) PCT No.: PCT/JP2020/039737
§ 371 (c)(1),
(2) Date: Apr. 22, 2022

(87) PCT Pub. No.: WO2021/079941
PCT Pub. Date: Apr. 29, 2021

(65) Prior Publication Data
US 2022/0371488 A1  Nov. 24, 2022

(30) Foreign Application Priority Data

Oct. 22, 2019  (JP) ................. 2019-192368

(51) Int. Cl.
*B60N 2/50* (2006.01)
*B60N 2/52* (2006.01)
*B60N 2/54* (2006.01)

(52) U.S. Cl.
CPC ............. *B60N 2/502* (2013.01); *B60N 2/522* (2013.01); *B60N 2/544* (2013.01); *B60N 2/548* (2013.01)

(58) Field of Classification Search
CPC ........ B60N 2/502; B60N 2/505; B60N 2/522; B60N 2/54; B60N 2/544; B60N 2/548
(Continued)

(56) References Cited

U.S. PATENT DOCUMENTS 4,880,201 A * 11/1989 Hall ...................... B60N 2/544
                                                        248/608
6,336,627 B1 * 1/2002 Fujita ..................... B60N 2/506
                                                        267/140.11
(Continued)

FOREIGN PATENT DOCUMENTS

JP          5930729 U        2/1984
JP       2001270367 A       10/2001
(Continued)

OTHER PUBLICATIONS

International Search Report (with English Translation) and Written Opinion (with Machine Translation) issued on Nov. 24, 2020 in corresponding International Patent Application No. PCT/JP2020/039737; 12 pages.

*Primary Examiner* — Jason S Daniels
(74) *Attorney, Agent, or Firm* — Maier & Maier, PLLC

(57) ABSTRACT

There are improved a vibration absorption characteristic and an impact absorption characteristic. A seat suspension mechanism set so that links of a first link mechanism on a base frame side and links of a second link mechanism on a seat support frame side, between which an intermediate frame is put, differ in operating angles, that is, so that the links of the second link mechanism operate in the range of an angle closer to a vertical to a front-rear direction of a vehicle body. This allows front-rear movement of the seat support frame through the second link mechanism to mainly respond to input vibrations of front-rear movement to (Continued)

thereby improve a vibration absorption characteristic and an impact absorption characteristic in the front-rear direction.

7 Claims, 13 Drawing Sheets

(58) Field of Classification Search
USPC .......................................... 296/65.02, 65.03
See application file for complete search history.

(56) References Cited

U.S. PATENT DOCUMENTS

| | | |
|---|---|---|
| 2003/0218282 A1 | 11/2003 | Sakamoto |
| 2006/0214458 A1* | 9/2006 | Meyer .................... B60N 2/505 |
| | | 296/65.02 |
| 2006/0237885 A1* | 10/2006 | Paillard ............... F16F 15/0232 |
| | | 296/65.02 |
| 2012/0007294 A1 | 1/2012 | Fujita et al. |
| 2020/0070695 A1* | 3/2020 | Fujita .................... F16F 15/022 |

FOREIGN PATENT DOCUMENTS

| | | |
|---|---|---|
| JP | 2003320884 A | 11/2003 |
| JP | 2010179719 A | 8/2010 |
| JP | 2010179720 A | 8/2010 |
| JP | 201948489 A | 3/2019 |
| WO | 2019049879 A1 | 3/2019 |

* cited by examiner

SEAT SUSPENSION MECHANISM

TECHNICAL FIELD

The present invention relates to a seat suspension mechanism used for support for a seat of a vehicle.

BACKGROUND

Japanese Patent Application Laid-open 2010-179719 and Japanese Patent Application Laid-open 2010-179720 disclose a seat suspension mechanism in which an upper frame (seat support frame) provided to be movable up and down relative to a lower frame (base frame) is elastically supported by a magnetic spring and torsion bars. This seat suspension mechanism has a region where, in a case where a characteristic that restoring force of the magnetic spring in the same direction as a working direction of restoring force of the torsion bars increases in accordance with an increase in a displacement amount is referred to as "a positive spring characteristic (a spring constant at this time is referred to as "a positive spring constant")" and a characteristic that the restoring force of the magnetic spring in the same direction as the working direction of the restoring force of the torsion bars decreases in spite of the increase in the displacement amount is referred to as "a negative spring characteristic (a spring constant at this time is referred to as "a negative spring constant")", by making use of the fact that the magnetic spring exhibits the negative spring characteristic in a predetermined displacement range and combining the magnetic spring with the torsion bars exhibiting the positive spring characteristic, a characteristic of a constant load where a load value relative to a displacement amount in the whole system resulting from the superposition of the characteristics of the two in the predetermined displacement range is substantially constant (a spring constant is substantially zero) is exhibited.

The seat suspension mechanism of Japanese Patent Application Laid-open 2010-179719 and Japanese Patent Application Laid-open 2010-179720 is configured such that, owing to the aforesaid structure using the magnetic spring and the torsion bars, normal vibrations having predetermined frequencies and amplitudes are absorbed using the constant load region where the spring constant resulting from the superposition of the spring constants of the two is substantially zero, while energy caused by impact vibration is absorbed by a damper suspended between the upper frame and the lower frame.

However, in a case of a driver seat of an earth-moving machine, because there are many occasions to run on a road surface having large bumps and potholes, it is necessary to put emphasis on measures against impact vibrations having a larger amplitude.

In consideration of this point, Japanese Patent Application Laid-open 2019-48489 proposes a seat suspension mechanism having a structure in which spring-damper attached suspension units are stacked in plurality.

SUMMARY

However, the seat suspension mechanism in Japanese Patent Application Laid-open 2019-48489 has the structure in which the emphasis is put basically on exhibiting high vibration absorption characteristic and impact absorption characteristic against input vibrations in an up-down direction. This has aroused the desire for development of the mechanism for further improvement in vibration absorption characteristic and impact absorption characteristic in the up-down direction and enhancement in vibration absorption characteristic and impact absorption characteristic in a front-rear direction.

The present invention was made in consideration of the above point, and has an object to provide a seat suspension mechanism capable of exhibiting high vibration absorption characteristic and impact absorption characteristic in the front-rear direction in addition to the up-down direction.

Means for Solving the Problems

To solve the above problem, a seat suspension mechanism of the present invention disposed between a vehicle body structure and a seat, the seat suspension mechanism includes:
  a base frame attached on the vehicle body structure side;
  a seat support frame attached on the seat side;
  an intermediate frame located between the base frame and the seat support frame;
  a first link mechanism supporting the intermediate frame with respect to the base frame;
  a second link mechanism supporting the seat support frame with respect to the intermediate frame;
  an up-down direction spring mechanism which elastically biases the intermediate frame with respect to the base frame; and
  a first damper suspended between the base frame and the intermediate frame,
  the first link mechanism and the second link mechanism are provided in a positional relationship in which straight lines connecting connection center points of links connecting the intermediate frame and the seat support frame in the second link mechanism are closer to a vertical to a front-rear direction of a vehicle body at a balanced point than straight lines connecting connection center points of links connecting the base frame and the intermediate frame in the first link mechanism, and a front-rear direction spring mechanism which exhibits elastic force in accordance with movement of the links of the second link mechanism is provided.

Preferably, the seat suspension mechanism further includes: a first elastic force adjusting member which adjusts elastic force of the up-down direction spring mechanism; and a second elastic force adjusting member which adjusts elastic force of the front-rear direction spring mechanism, wherein it is possible to separately adjust the elastic force of the up-down direction spring function and the elastic force of the front-rear direction spring function.

Preferably, the seat suspension mechanism further includes a second damper which is suspended between the intermediate frame and the seat support frame and whose damping force acts when an impact force equal to or more than a predetermined force is input.

Preferably, the front-rear direction spring mechanism is constituted by using torsion coil springs in which one-side ends are engaged on the seat support frame side and the other ends are engaged on the second link mechanism side respectively, and twisted in accordance with the movement of the links of the second link mechanism.

Preferably, in the links constituting the second link mechanism, between connection center points with the seat support frame between a pair of the links spaced in a width direction on at least either a front side or a rear side, a torsion bar for preventing bottoming, which exhibits elastic force to separate the seat support frame from the intermediate frame in an up-down direction, is further provided.

Preferably, the up-down direction spring mechanism includes:

a linear spring which exhibits a linear spring characteristic of exhibiting elastic force to separate the intermediate frame from the base frame in the up-down direction; and a magnetic spring which includes stationary magnets and a movable magnet whose relative position to the stationary magnets is displaced in accordance with up-down movement of the intermediate frame relative to the base frame, and exhibits a nonlinear spring characteristic that a spring constant is changed depending on the relative position of the stationary magnets and the movable magnet, and wherein a spring characteristic of combining the linear spring and the magnetic spring includes a characteristic of being a constant load when the intermediate frame is located in a predetermined up-down movement range including a balanced point.

Preferably, the up-down direction spring mechanism further includes an auxiliary spring mechanism which includes, between the base frame and the intermediate frame, a pantograph link and a tensile coil spring suspended on the pantograph link, and exhibits a spring characteristic of biasing the intermediate frame downward when the intermediate frame is located in the predetermined up-down movement range including the balanced point, and wherein a spring characteristic of further combining the auxiliary spring mechanism with the linear spring and the magnetic spring includes the characteristic of being the constant load when the intermediate frame is located in the predetermined up-down movement range including the balanced point.

Effect of the Invention

The seat suspension mechanism of the present invention is set so that the links of the first link mechanism on the base frame side and the links of the second link mechanism on the seat support frame side, between which the intermediate frame is put, differ in the operating angles, that is, so that the links of the second link mechanism operate in the range of the angle closer to the vertical to the front-rear direction of the vehicle body. This allows the front-rear movement of the seat support frame through the second link mechanism to mainly respond to the input vibrations of front-rear movement to thereby improve vibration absorption characteristic and impact absorption characteristic in the front-rear direction. Further, the seat suspension mechanism has the front-rear direction spring mechanism which exhibits the elastic force in accordance with the movement of the second link mechanism in addition to the up-down direction spring mechanism which exhibits the elastic force in accordance with the movement of the first link mechanism. Therefore, by a phase difference in accordance with a difference in elastic force between the up-down direction spring mechanism and the front-rear direction spring mechanism, a natural frequency in the up-down direction as the entire seat suspension mechanism is determined, which allows improvement in vibration absorption characteristic and impact absorption characteristic in the up-down direction. Further, by making the elastic forces of the up-down direction spring mechanism and the front-rear direction spring mechanism separately adjustable, the aforesaid phase difference can be adjusted, resulting in allowing a response to various vibrations and impacts.

DETAILED DESCRIPTION OF THE EMBODIMENTS

Figure 1:
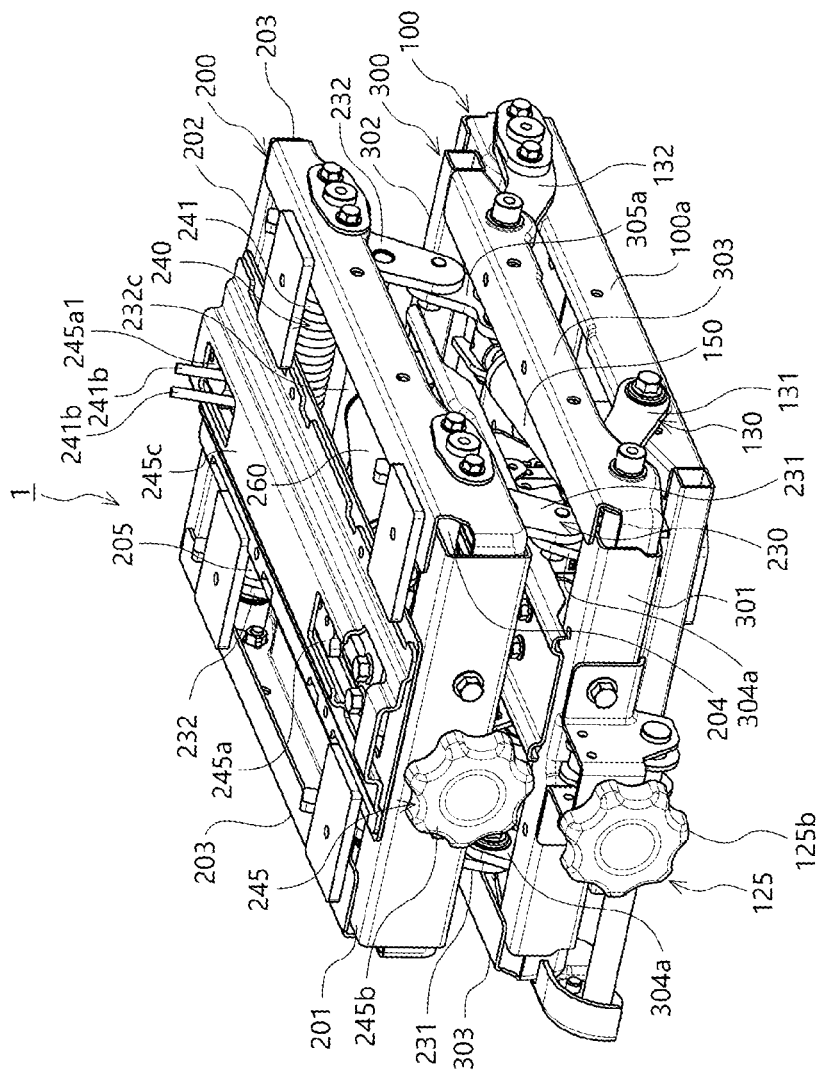
FIG. 1 is a perspective view illustrating a seat suspension mechanism according to one embodiment of the present invention.

The present invention will be hereinafter described in more detail based on embodiments illustrated in the drawings. FIG. 1 to FIG. 5 illustrate the entire configuration of a seat suspension mechanism 1 according to this embodiment. The seat suspension mechanism 1 supports a seat for vehicle of a passenger car, a truck, a bus, a forklift, or the like.

As illustrated in FIG. 1, the seat suspension mechanism 1 has a base frame 100 and a seat support frame 200, the base frame 100 is fixed to a vehicle floor on a vehicle body structure side, and the seat support frame 200 is attached on a seat side. Moreover, the seat suspension mechanism 1 includes an intermediate frame 300 between the base frame 100 and the seat support frame 200. The base frame 100 fixed to the vehicle floor is formed in a substantially square shape in plan view, and the intermediate frame 300 is supported through a first link mechanism 130.

The first link mechanism 130 has a pair of left and right front links 131, 131 and a pair of left and right rear links 132, 132. In the front links 131, 131, lower portions 131a, 131a are rotatably supported close to the front portion of side edge portions 100a, 100a of the base frame 100, and upper portions 131b, 131b are linked close to a front frame 301 on side frames 303, 303 of the intermediate frame 300 (refer to FIG. 3).

In the rear links 132, 132, lower portions 132a, 132a are rotatably supported close to the rear portion of the side edge portions 100a, 100a of the base frame 100, and upper portions 132b, 132b are linked to the side frames 303, 303 close to a rear frame 302 of the intermediate frame 300. With this structure, the intermediate frame 300 is movable up and down relative to the base frame 100, more accurately, since the first link mechanism 130 is constituted by a parallel link structure including the front links 131, 131 and the rear links 132, 132, the intermediate frame 300 moves up and down along a rotation trajectory of the front links 131, 131 and the rear links 132, 132. That is, with the displacement along a rotation direction of the front links 131, 131 and the rear links 132, 132 having the lower portions 131a, 131a, 132a, 132a, which are connection center points of the links 131, 131, 132, 132 and the base frame 100, as rotation centers, that is, along a direction in which the front links 131, 131 and the rear links 132, 132 fall forward to go toward a lower limit position (a counterclockwise direction in FIG. 3) and a direction in which they return to the opposite of the above direction to go toward an upper limit position (a clockwise direction in FIG. 3), the intermediate frame 300 moves up and down.

Figure 3:
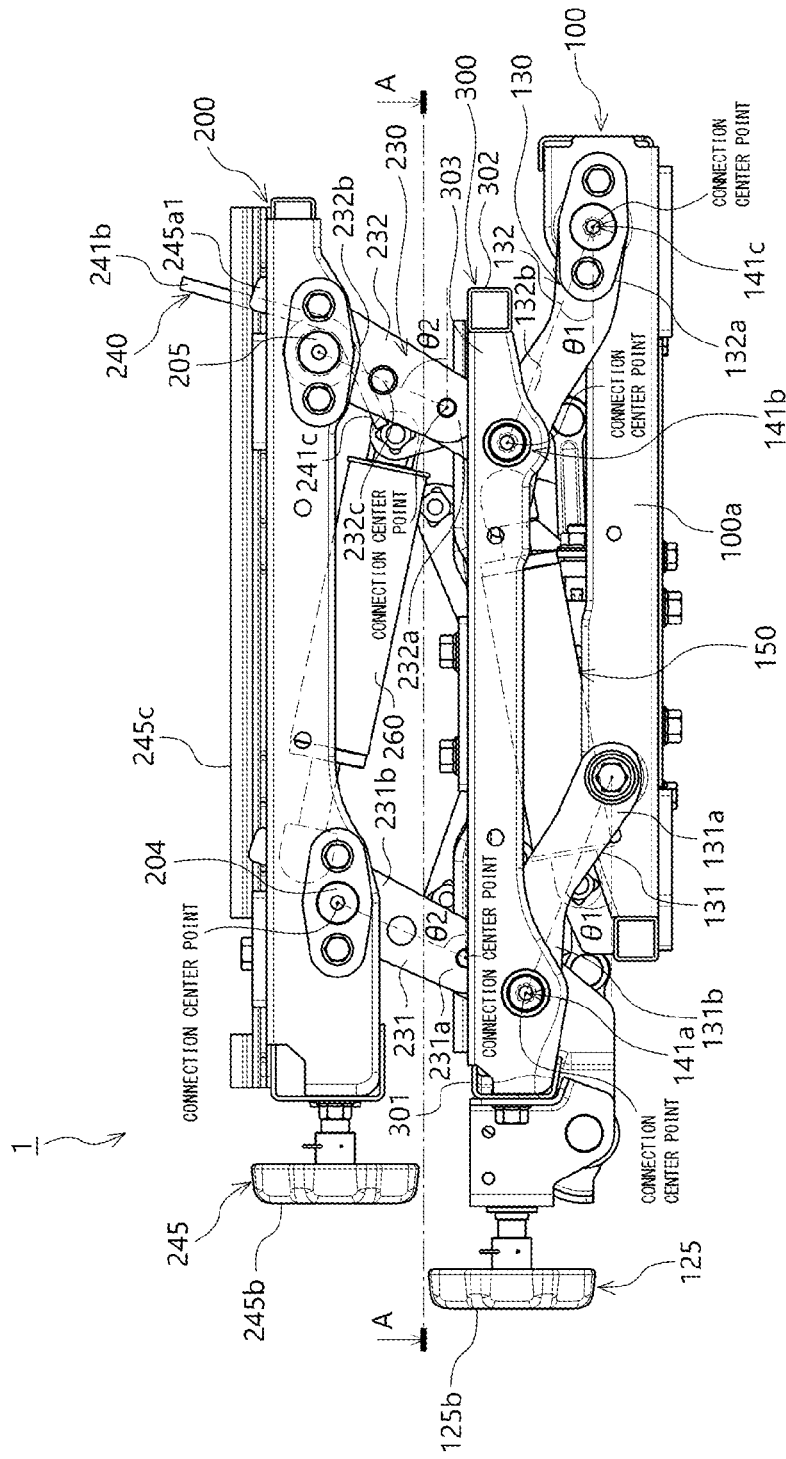
FIG. 3 is a side view of FIG. 1.

Between connection center points of the side frames 303, 303 separated at a predetermined distance in a width direction in the intermediate frame 300 and the front links 131, 131, a first torsion bar 141a is disposed, and between connection center points of the side frames 303, 303 and the rear links 132, 132, a second torsion bar 141b is disposed (refer to FIG. 3). In this embodiment, the torsion bars 141a, 141b are linear springs which exhibit a linear characteristic that their load-deflection characteristic changes approximately linearly, and are combined with a later-described magnetic spring 142 to constitute an up-down spring mechanism 140 including a characteristic of being a constant load in a predetermined displacement range. However, in this embodiment, to enhance a function of preventing bottoming by strengthening a linear spring characteristic, a third torsion bar 141c is disposed between the lower portions 132a, 132a of the rear links 132, 132. One-side ends of the first and second torsion bars 141a, 141b are linked to the upper portions 131b, 131b, 132b, 132b of the front links 131, 131 and the rear links 132, 132, and the other ends of the first and second torsion bars 141a, 141b are provided not to rotate relative to the side frames 303, 303 of the intermediate frame 300 respectively. One end of the third torsion bar 141c is linked to the lower portions 132a, 132a of the rear links 132, 132, and the other end of the third torsion bar 141c is provided not to rotate relative to the side edge portion 100a of the base frame 100.

Hence, the torsion bars 141a, 141b, 141c are set to exhibit elastic force for biasing in a direction of relatively separating the intermediate frame 300 from the base frame 100, that is, in an upward direction. Further, the other ends of the first and second torsion bars 141a, 141b are connected to plate members 125c, 125d of a first elastic force adjusting member 125 respectively (refer to FIG. 5).

The first elastic force adjusting member 125 is configured such that the rotation of its adjustment dial 125b causes the rotation of its adjustment shaft 125a, and this rotation causes the rotation of the plate member 125c connected to the first torsion bar 141a on the front links 131, 131 sides and then causes the rotation of the plate member 125d linked to the plate member 125c through a link plate 125e and connected to the second torsion bar 141b on the rear links 132, 132 sides. Therefore, when the adjustment dial 125b is operated to rotate, the first and second torsion bars 141a, 141b are twisted in either direction, so that initial elastic force of the first and second torsion bars 141a, 141b is adjusted, and depending on the weight of a seated person, it is possible to adjust the position of the intermediate frame 300 and the later-described seat support frame 200 supported through the intermediate frame 300 to a predetermined position in the up-down direction (preferably a neutral position).

Note that as the linear springs for biasing in the direction of relatively separating the intermediate frame 300 from the base frame 100, the torsion bars 141a, 141b, 141c are preferred. The torsion bars 141a, 141b, 141c themselves are each centered on a rotary shaft to be twisted, thereby exhibiting a predetermined spring force. In contrast with this, the linear spring characteristic can also be exhibited by disposing a coil spring in a substantially vertical direction between the base frame 100 and the intermediate frame 300, but in this case, friction is produced on a portion where the coil spring is suspended and supported. This mainly causes high friction damping in the seat suspension mechanism 1.

Figure 5:
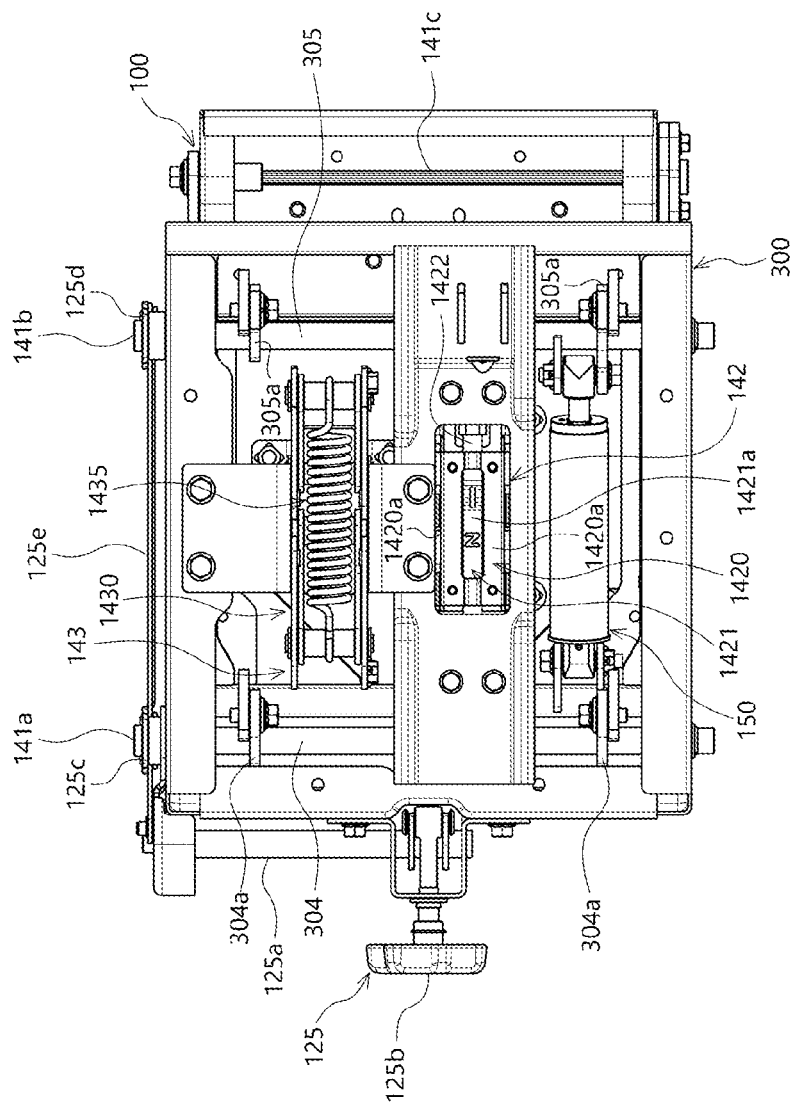
FIG. 5 is an arrow view taken along a line A-A of FIG. 3.
Figure 6:
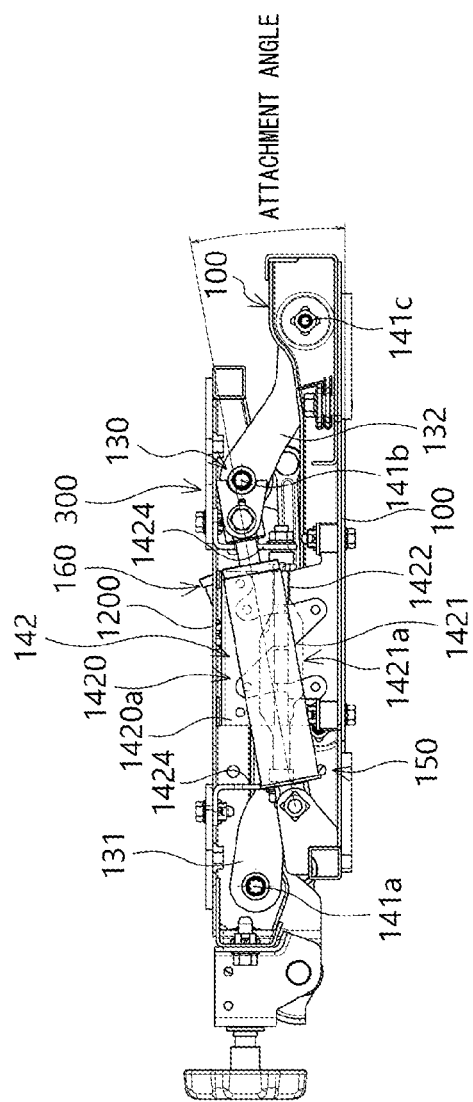
FIG. 6 is a sectional view for explaining a support structure of an intermediate frame with respect to a base frame.

The magnetic spring 142 includes a stationary magnet unit 1420 and a movable magnet unit 1421 as illustrated in FIG. 5 and FIG. 6. The stationary magnet unit 1420 is fixed to the base frame 100, and has a pair of stationary magnets 1420a, 1420a arranged to face each other at a predetermined distance in a width direction of the base frame 100. The facing stationary magnets 1420a, 1420a are arranged so that bipolar magnets whose different poles are adjacent to each other in a vertical direction are used and the same poles face each other, for example. The movable magnet unit 1421 includes a movable magnet 1421a disposed in a space between the stationary magnets 1420a, 1420a disposed to face each other at the predetermined distance. The movable magnet 1421a is magnetized in the vertical direction, and supported by a support member 1422, and the support member 1422 is linked to brackets 1424 fixed to the intermediate frame 300 and extending downward, for example. For this reason, when the intermediate frame 300 moves up and down relative to the base frame 100, the movable magnet 1421a supported by the support member 1422 is displaced up and down in the space between the stationary magnets 1420a, 1420a.

Figure 7:
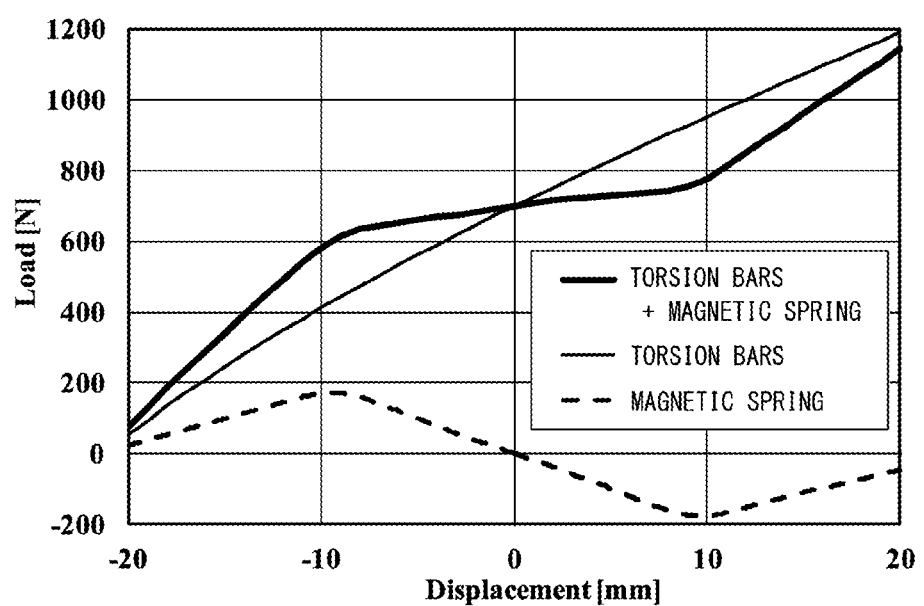
FIG. 7 is a chart exemplifying load-deflection characteristics of torsion bars and a magnetic spring, and a load-deflection characteristic obtained by superimposing the two.

The spring characteristic that the magnetic spring 142 exhibits when the movable magnet 1421a moves in the space between the stationary magnets 1420a, 1420a changes depending on a relative position of the movable magnet 1421a and the stationary magnets 1420a, 1420a. For example, as illustrated in FIG. 7, if a characteristic that restoring force increases in a working direction of the elastic force (restoring force) of the torsion bars 141a, 141b, 141c which are the linear springs, that is, in a direction of separating the intermediate frame 300 from the base frame 100 is referred to as a positive spring characteristic, the magnetic spring 142 exhibits, in its load-deflection characteristic, a negative spring characteristic that the restoring force in this direction reduces in a predetermined displacement amount range (a characteristic indicated with a dotted line in the chart). That is, the negative spring characteristic is exhibited in a predetermined range in the vicinity of a position where the movable magnet 1421a crosses a boundary of the N pole and the S pole of the two stationary magnets 1420a, 1420a whose different poles are adjacent to each other (a range from about −9 mm to about +10 mm in an example in FIG. 7).

As a result, in the up-down direction spring mechanism 140 of this embodiment including the magnetic spring 142 and the above-described torsion bars 141a, 141b, 141c, in the range where the negative spring characteristic acts in the magnetic spring 142 (the range from about −9 mm to about +10 mm in the example in FIG. 7), a spring constant is reduced.

Here, the reduction in the spring constant resulting from the superposition of the positive spring characteristic of the torsion bars 141a, 141b, 141c and the negative spring characteristic of the magnetic spring 142 is as described above, and as the spring characteristic obtained by superposing the two, a configuration to have a constant load region where a change amount of a load value is equal to or less than a predetermined amount even if the displacement amount increases, that is, a region where the spring constant is substantially zero (preferably, a spring constant within a range of about −10 N/mm to about 10 N/mm) is preferred. However, in this embodiment, due to the use of the three torsion bars 141*a*, 141*b*, 141*c*, even the superposition of the negative spring characteristic of the magnetic spring 142 thereon sometimes prevents an adjustment to the aforesaid constant load region depending on a size, magnetic force, or the like of the magnetic spring 142. Thus, in such a case, as in this embodiment, an auxiliary spring mechanism 143 which exhibits the negative spring characteristic is preferably further provided.

Figure 8:
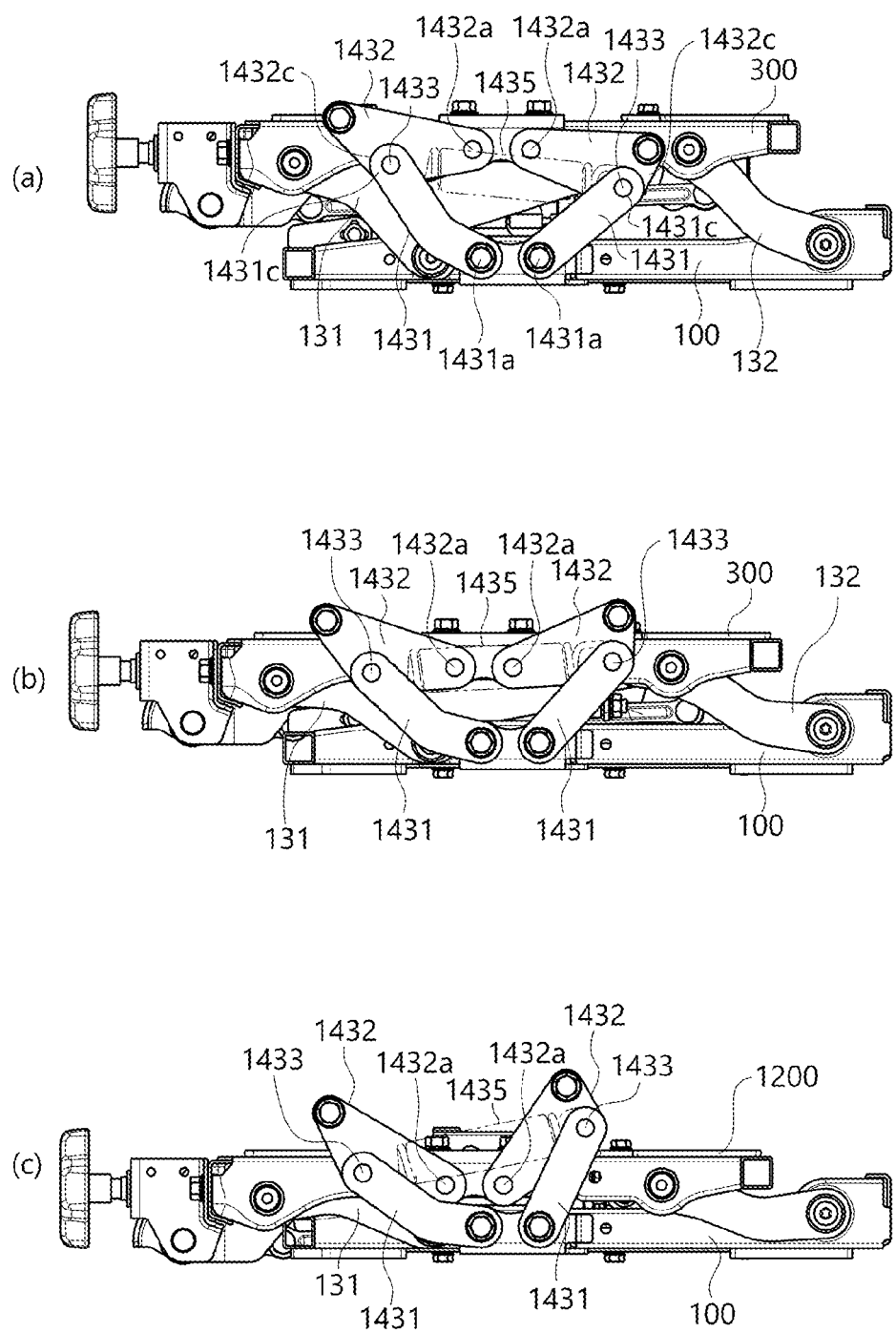
FIG. 8(a) illustrates an explanation of configuration and action of an auxiliary spring mechanism provided between the base frame and the intermediate frame.
FIG. 8(b) illustrates an explanation of configuration and action of an auxiliary spring mechanism provided between the base frame and the intermediate frame.
FIG. 8(c) illustrates an explanation of configuration and action of an auxiliary spring mechanism provided between the base frame and the intermediate frame.

The auxiliary spring mechanism 143 used in this embodiment includes a pantograph link 1430 and a tensile coil spring 1435 as illustrated in FIG. 5 and FIG. 8. The pantograph link 1430 has two fixed-side links 1431, 1431 whose one-side ends 1431*a*, 1431*a* are supported by the base frame 100 and which are disposed to be widened in a substantially V shape as going toward the other ends 1431*c*, 1431*c*, and two movable-side links 1432, 1432 whose one-side ends 1432*a*, 1432*a* are supported by the intermediate frame 300 and which are disposed so that virtual lines connecting the one-side ends 1432*a*, 1432*a* and the other ends 1432*c*, 1432*c* are in a substantially inverted V shape in a position where the intermediate frame 300 is located at the top end (position in FIG. 8(*a*)).

The tensile coil spring 1435 is suspended between shaft members 1433, 1433 supporting both the other ends 1432*c*, 1432*c* of the movable-side links 1432, 1432 and the other ends 1431*c*, 1431*c* of the fixed-side links 1431, 1431.

The auxiliary spring mechanism 143 is constituted as described above, and thereby when the pantograph link 1430 is displaced in the up-down direction, directions of the movable-side links 1432, 1432 are opposite between when the one-side ends 1432*a*, 1432*a* of the movable-side links 1432, 1432 are located at a further upper position than a straight line connecting the shaft members 1433, 1433 which are engagement support points in the tensile coil spring 1435 (a position in FIG. 8(*a*)) and when they are located at a further lower position than the straight line (a position in FIG. 8(*c*)). This causes the tensile coil spring 1435 to bias the one-side ends 1432*a*, 1432*a* of the movable-side links 1432, 1432 upward when the intermediate frame 300 is located at the further upper position than the predetermined position (the position in FIG. 8(*a*)), and to bias the one-side ends 1432*a*, 1432*a* of the movable-side links 1432, 1432 downward when the intermediate frame 300 is located at the further lower position than the predetermined position (the position in FIG. 8(*c*)). Accordingly, by setting a position in the vicinity of a neutral position of the intermediate frame 300, that is, in the vicinity of a balanced point when a person is seated at a position where the biasing directions through the tensile coil spring 1435 are reversed (a position in FIG. 8(*b*)), in the predetermined displacement range, preferably the above-described range where the magnetic spring 142 exhibits the negative spring characteristic (between the position in FIG. 8(*b*) and the position in FIG. 8(*c*)), the auxiliary spring mechanism 143 exhibits the negative spring characteristic of biasing the one-side ends 1432*a*, 1432*a* of the movable-side links 1432, 1432 downward.

Accordingly, in this embodiment, not only the negative spring characteristic of the magnetic spring 142 but also the negative spring characteristic caused by the auxiliary spring mechanism 143 in which the tensile coil spring 1435 is combined with the pantograph link 1430 is superposed. Therefore, in this embodiment, even such a configuration as to dispose the three torsion bars 141*a*, 141*b*, 141*c* which exhibit the positive spring characteristic, and set the spring force in the positive direction to be high makes it possible to generate the constant load region, resulting in also allowing a response to a further increase in load mass. Further, the change in the biasing directions in the middle of the range of the displacement of the intermediate frame 300 in the up-down direction as described above allows the auxiliary spring mechanism 143 to act, until the change, for example, until the intermediate frame 300 reaches the point of the change downward from the upper position (until reaching the position in FIG. 8(*b*) from the position in FIG. 8(*a*)), reversely, until the intermediate frame 300 reaches the point of the change upward from the lower position (until reaching the position in FIG. 8(*b*) from the position in FIG. 8(*c*)), as braking force against the directions of the respective movements, and also contribute to improvement in impact absorption characteristic.

Figure 9:
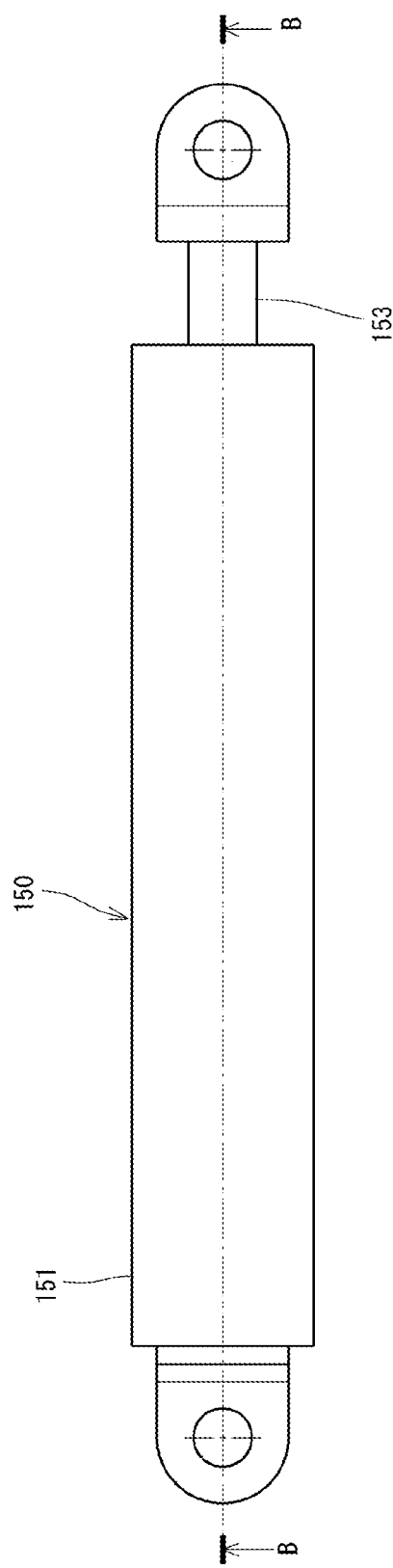
FIG. 9 is a side view of a first damper.
Figure 10:
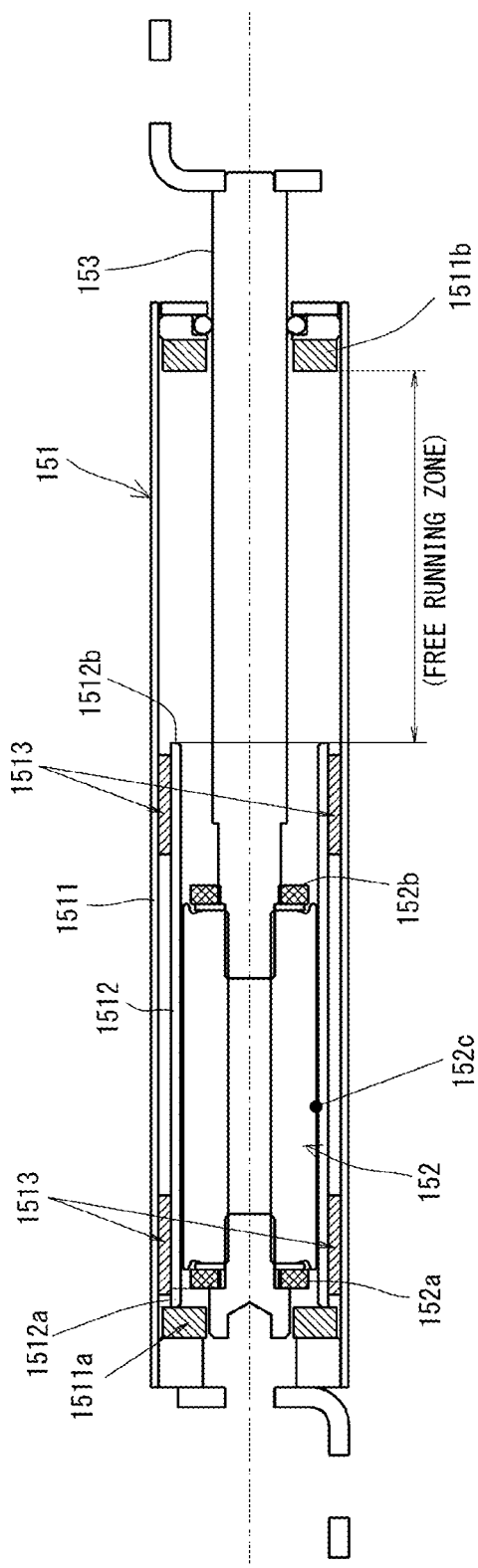
FIG. 10 is a sectional view taken along a B-B line of FIG. 9.

Between the base frame 100 and the intermediate frame 300, a first damper 150 which exhibits damping force to absorb energy when the two move up and down relatively is provided. The first damper 150 is a telescopic one including a cylinder 151 and a piston 152 which moves relatively in the cylinder 151 as illustrated in FIG. 9 and FIG. 10. Further, at the neutral position in the up-down direction operation of the intermediate frame 300, for example, the first damper 150 is attached at an attachment angle in a range of about 10 to 30 degrees (refer to FIG. 6). Note that a plurality of the first dampers 150 can also be provided in parallel, and in this case, by making the attachment angles of the first dampers 150 different from each other, the smaller attachment angle the damper has, the smaller a vertical component of the damping force becomes, and the damping force which acts on the intermediate frame 300 and the base frame 100 is moderate in effectiveness as compared with a case of disposing all the dampers at the same attachment angle.

A normal oil damper or the like can also be used as the first damper 150, and a movement zone of the piston 152 in the cylinder 151 corresponding to a predetermined up-down movement range including the balanced point when the intermediate frame 300 moves up and down relative to the base frame 100 (the position in being seated in a static state. The position aligned with the neutral position of the intermediate frame 300 as much as possible by an adjustment with the first elastic force adjusting member 125) is preferably a free running zone where the damping force does not act.

The first damper 150 having such a free running zone takes on a dual cylinder structure in which the cylinder 151 includes an outer fixed cylinder 1511 and an inner movable cylinder 1512 disposed in the inside thereof as illustrated in FIG. 10. The piston 152 is disposed to be slidable in the inner movable cylinder 1512. Stopper portions 1511*a*, 1511*b* are provided at long-side-direction end portions of the outer fixed cylinder 1511, and the inner movable cylinder 1512 is shorter in axial-direction length than the outer fixed cylinder 1511 and can move until end portions 1512*a*, 1512*b* in the long-side direction of the inner movable cylinder 1512 abut on the stopper portions 1511*a*, 1511*b*. The piston 152 is also similar, and can move until end portions 152*a*, 152*b* in the long-side direction abut on the stopper portions 1511*a*, 1511*b*. In the axial-direction length, the inner movable cylinder 1512 is longer than the piston 152, and the piston rod 153 is linked to the piston 152.

The piston 152 is provided with a string portion 152c formed by winding a linear member such as a thread which exhibits a predetermined friction damping force between the inner movable cylinder 1512 and the piston 152 around its outer peripheral portion. In this embodiment, a viscous fluid such as grease having low consistency is made to adhere to the string portion 152c. The viscous fluid can be made to adhere to the linear member such as the thread composing the string portion 152c by impregnation or coating. Accordingly, when the piston 152 moves relative to the inner movable cylinder 1512, the friction damping force caused by tension of the linear member composing the string portion 152c and viscous damping force of speed dependence caused by the viscous fluid act. That is, by a relative displacement of the piston 152 to the inner movable cylinder 1512, friction force between the two is converted to the tension of the string portion 152c, and with an increase in the displacement amount, the thread composing the string portion 152c is hardened integrally to change in the course of reducing a friction coefficient, thereby suppressing heat generation. This change causes the viscous damping force to be speed-dependent. Therefore, the action of the friction damping force becomes relatively large in a low-speed input, but the viscous damping force becomes higher as the speed increases. Note that depending on increase and decrease in the number of turns of the thread composing the string portion 152c, a gap between adjacent portions of the wound thread, the number of stacks of the wound thread, or the like, the friction force and the viscous damping force to be generated are appropriately controlled.

On one hand, between an outer peripheral surface of the inner movable cylinder 1512 and an inner peripheral surface of the outer fixed cylinder 1511, so as to make friction force between the two relatively smaller than the friction force generated by the string portion 152c between the inner movable cylinder 1512 and the piston 152, in this embodiment, between the inner movable cylinder 1512 and the outer fixed cylinder 1511, a low-friction member 1513 such as a rolling member or a sliding member (for example, felt) is interposed.

This makes the inner movable cylinder 1512 and the piston 152 move together in the outer fixed cylinder 1511 owing to a difference between the friction force between the inner movable cylinder 1512 and the piston 152, and, the friction force between the inner movable cylinder 1512 and the outer fixed cylinder 1511 until the end portions 1512a 1512b of the inner movable cylinder 1512 abut on the stopper portions 1511a 1511b when the piston 152 moves relatively in the cylinder 151 while following movement of the piston rod 153. At this time, frictional resistance is very small between the inner movable cylinder 1512 and the outer fixed cylinder 1511 owing to the low-friction member 1513, and the inner movable cylinder 1512 substantially freely runs in the outer fixed cylinder 1511 to generate little damping force. After the end portions 1512a, 1512b of the inner movable cylinder 1512 abut on either of the stopper portions 1511a, 1511b, because the inner movable cylinder 1512 is prevented from moving, the piston 152 slides in the inner movable cylinder 1512 alone. This makes such friction damping force and viscous damping force as described above act between the piston 152 and the inner movable cylinder 1512.

Accordingly, a range where the inner movable cylinder 1512 of the cylinder 151 moves relatively in the outer fixed cylinder 1511 becomes a free running zone where the damping force does not substantially act, and a distance of the free running zone corresponds to a difference in the axial-direction length between the outer fixed cylinder 1511 and the inner movable cylinder 1512. As a result, when the intermediate frame 300 is located in the predetermined up-down movement range including the balanced point, the movement zone where the piston 152 does not move relative to the inner movable cylinder 1512 and the damping force does not effectively work is formed. Preferably, at the balanced point in a seated state when the intermediate frame 300 moves up and down relative to the base frame 100 (the position adjusted so as to be aligned with a neutral position of the entire stroke, in which the intermediate frame 300 can move up and down, as much as possible), the inner movable cylinder 1512 is set to be at a substantially middle position of the entire movement range in the outer fixed cylinder 1511. This causes the predetermined up-down movement range including the balanced point to be formed evenly on the upper and lower sides thereof centered at the balance point.

When the intermediate frame 300 is swung relatively by a vibration input during driving, in a case where the first damper 150 responds to the aforesaid free running zone, the damping force does not substantially act, and the up-down direction spring mechanism 140 mainly serves a vibration absorbing function, and in a case where a vibration with a low-frequency amplitude equal to or larger than a predetermined amplitude is input, the damping force of the first damper 150 acts to absorb impact energy. Further, the auxiliary spring mechanism 143 of this embodiment is also useful for absorption of the impact energy as described above.

Figure 4:
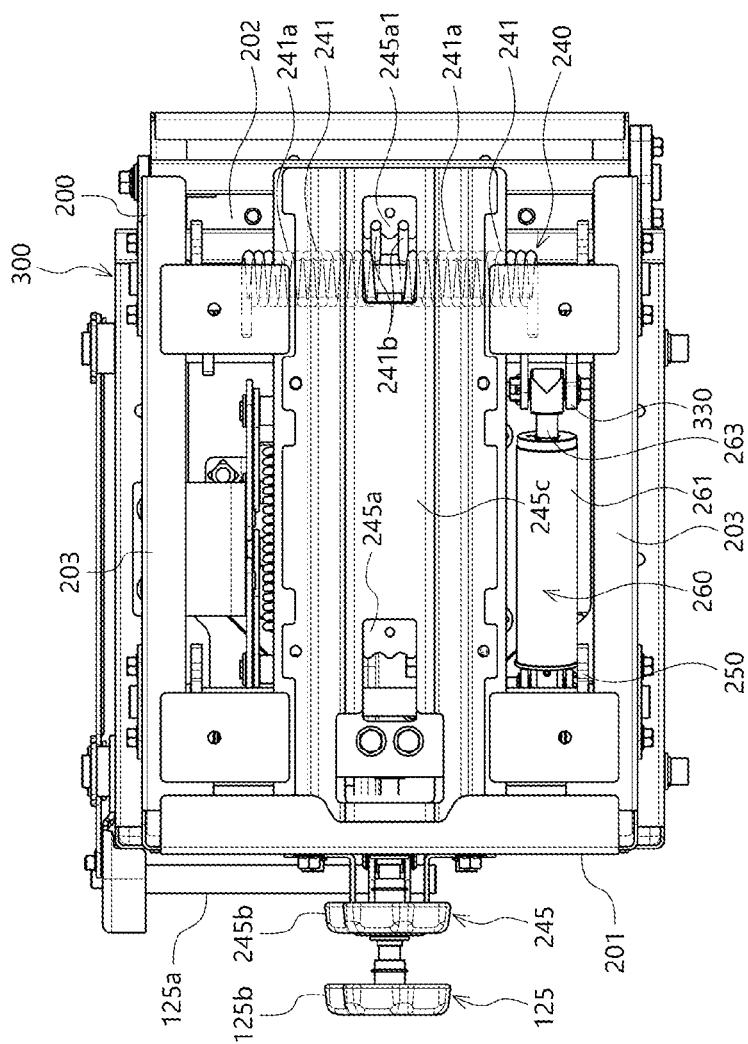
FIG. 4 is a plan view of FIG. 1.

The seat support frame 200 is formed in a substantially square shape having a front frame 201, a rear frame 202, and side frames 203, 203 each connecting end portions of the front frame 201 and the rear frame 202 with each other (refer to FIG. 1 and FIG. 4). The seat support frame 200 is supported with respect to the intermediate frame 300 through a second link mechanism 230. The second link mechanism 230 is constituted by a parallel link structure having a pair of left and right front links 231, 231 and a pair of left and right rear links 232, 232, similarly to the above-described first link mechanism 130, as illustrated in FIG. 3. As illustrated in FIG. 1 and FIG. 5, lower portions 231a, 231a of the front links 231, 231, through which the first torsion bar 141a disposed in the intermediate frame 300 is inserted inside, are supported by first brackets 304a, 304a fixed in the vicinity of end portions of a first pipe member 304 suspended between the side frames 303, 303 along the width direction of the intermediate frame 300. Lower portions 232a, 232a of the rear links 232, 232, through which the second torsion bar 141b disposed in the intermediate frame 300 is inserted inside, are supported by second brackets 305a, 305a fixed in the vicinity of end portions of a second pipe member 305 suspended between the side frames 303, 303 along the width direction of the intermediate frame 300.

Upper portions 231b, 231b of the front links 231, 231 are supported by an attachment shaft 204 suspended between the side frames 203, 203 close to the front frame 201 of the seat support frame 200, and upper portions 232b, 232b of the rear links 232, 232 are supported by an attachment shaft 205 suspended between the side frames 203, 203 close to the rear frame 202 thereof.

This causes the seat support frame 200 to rotatably move with respect to the intermediate frame 300 centered at the lower portions 231a, 232a of the front links 231, 231 and the rear links 232, 232. However, the links 131, 131, 132, 132 of the first link mechanism 130 are designed to, in a forward inclined position at the balanced point, change the movement of the intermediate frame 300 within this forward inclined position, whereas the links 231, 231, 232, 232 of the second link mechanism 230 are designed to be in a backward inclined position at the balanced point and to change the movement of the seat support frame 200 within this backward inclined position. That is, setting the links 131, 131, 132, 132 of the first link mechanism 130 and the links 231, 231, 232, 232 of the second link mechanism 230 in the positions where the inclined directions are opposite allows a reduction in front-rear movement of the seat support frame 200 and a seat supported by it.

Figure 11:
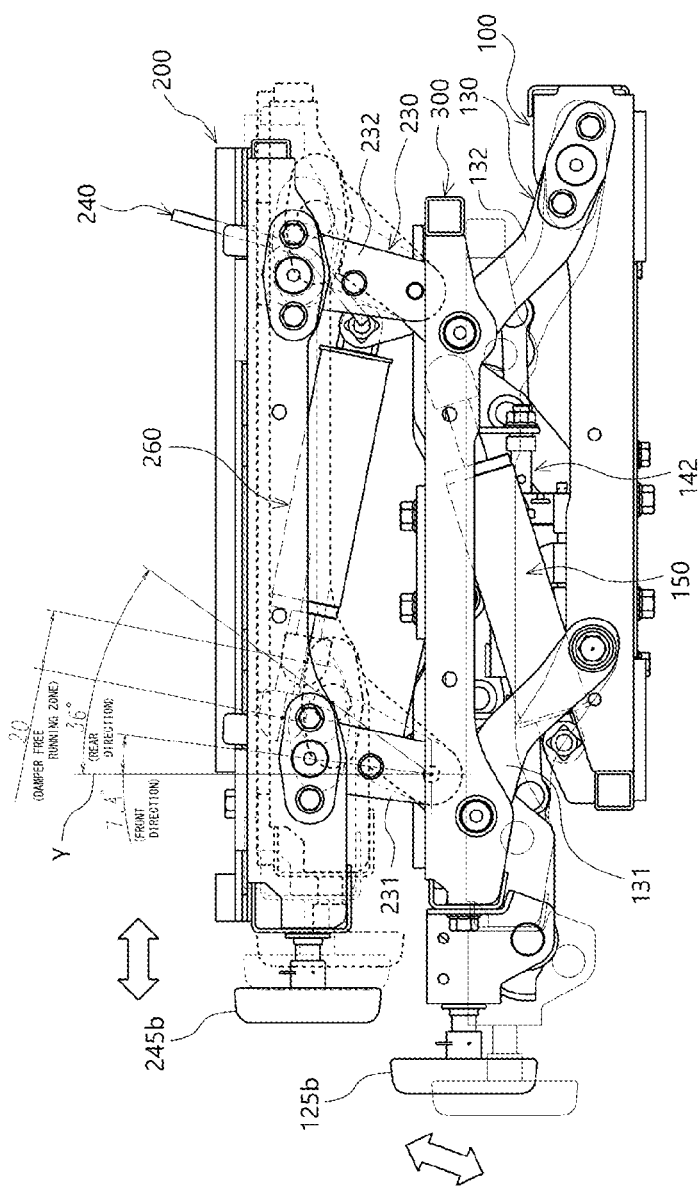
FIG. 11 illustrates an explanation of operation in a front-rear direction and operation in a topping direction of the seat suspension mechanism of the above embodiment.
Figure 12:
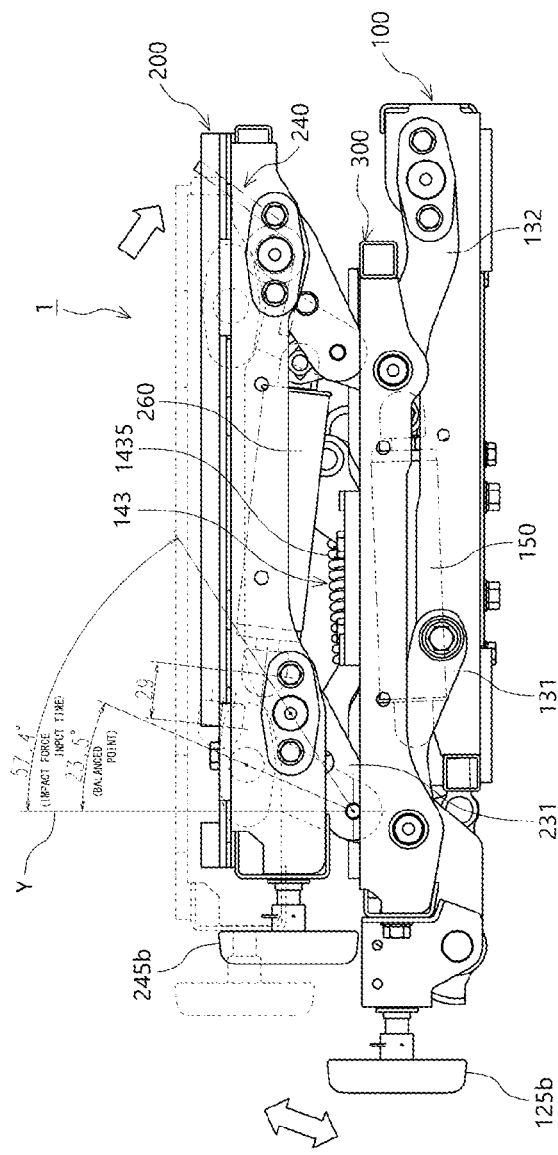
FIG. 12 illustrates an explanation of operation in a bottoming direction of the seat suspension mechanism of the above embodiment.

Here, the second link mechanism 230 is provided in a positional relationship in which straight lines connecting connection center points of the links 231, 231, 232, 232 connecting the intermediate frame 300 and the seat support frame 200 are closer to a vertical to the front-rear direction of the vehicle body at the balanced point than straight lines connecting the connection center points of the links 131, 131, 132, 132 connecting the base frame 100 and the intermediate frame 300 in the first link mechanism 130 when seen from the side. The second link mechanism 230 is provided preferably in a position where an inclination angle θ2 of the links 231, 231, 232, 232 of the second link mechanism 230 from a horizontal plane at the balanced point is closer to the vertical by 15 degrees or more relative to an inclination angle θ1 of the links 131, 131, 132, 132 of the first link mechanism 130 from the horizontal plane at the balanced point, more preferably in a position where the inclination angle θ2 is closer to the vertical by 25 degrees to 35 degrees relative to the inclination angle θ1 (refer to FIG. 3). In this embodiment, the second link mechanism 230 is provided to be displaceable in the front-rear direction in a range, where the position of the balanced point is set at a 23.5-degree backward-inclined position in reference to a plane Y vertical to the horizontal plane as illustrated in FIG. 12, of 16.1 degrees forward (a 7.4-degree backward-inclined position from the vertical plane Y) and 12.5 degrees backward (a 36-degree backward-inclined position from the vertical plane Y) in reference to the balanced point as illustrated in FIG. 11.

Hence, the links 231, 231, 232, 232 of the second link mechanism 230 can hold a larger displacement amount in the front-rear direction than in the up-down direction in a normal vibration input as compared with the links 131, 131, 132, 132 of the first link mechanism 130, and act more sensitively to vibrations in the front-rear direction. However, in this embodiment, when an impact force equal to or more than a predetermined force is input in the up-down direction, the second link mechanism 230 is set to allow an inclination from the aforesaid vertical plane Y to 57.4 degrees backward at the maximum (refer to FIG. 12).

The second link mechanism 230 is provided with a front-rear direction spring mechanism 240 which exhibits elastic force in accordance with the movement of the links 231, 231, 232, 232. The front-rear direction spring mechanism 240 is formed of a torsion coil spring having a coil section with a predetermined length. In this embodiment, the front-rear direction spring mechanism 240 has two torsion coil springs 241, 241 (refer to FIG. 4). The torsion coil springs 241, 241 are provided so that coil portions 241a, 241a are disposed around the attachment shaft 205 connecting connection center points of the seat support frame 200 and the upper portions 232b, 232b of the left and right rear links 232, 232. In this embodiment, the torsion coil springs 241, 241 are respectively provided on the left side and the right side with a long-direction middle portion of the attachment shaft 205 regarded as the border.

Figure 2:
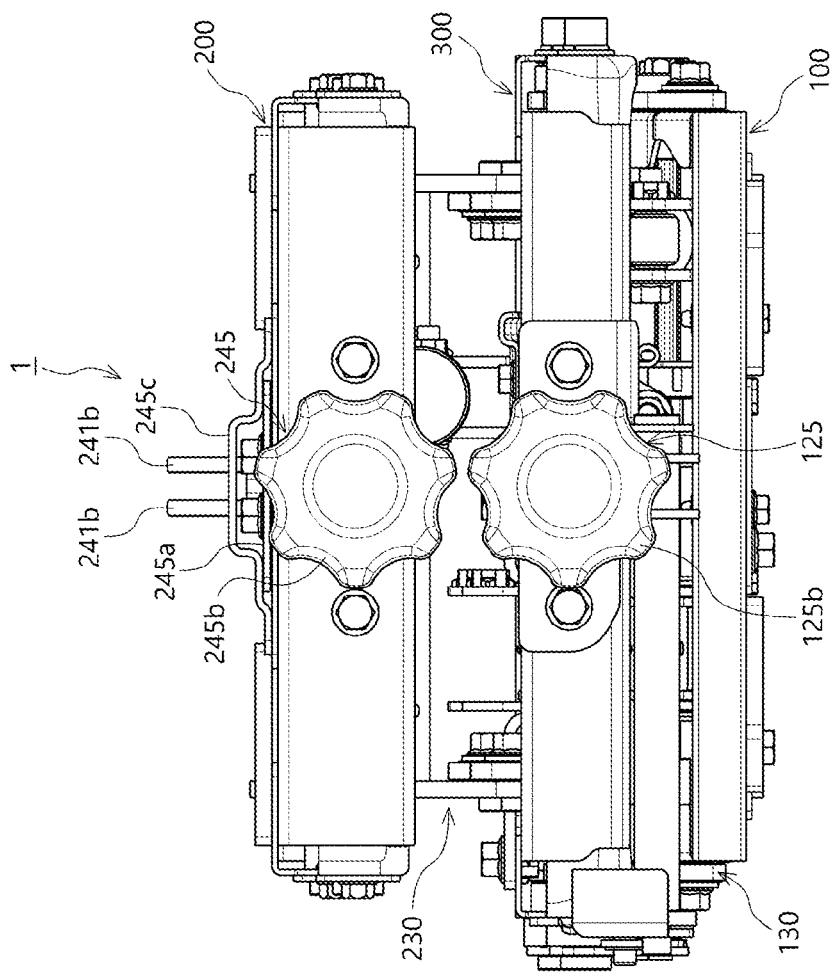
FIG. 2 is a front view of FIG. 1.

Between the front frame 201 and the rear frame 202 of the seat support frame 200, an adjustment plate 245a constituting a later-described second elastic force adjusting member 245 is suspended (refer to FIG. 1, FIG. 2 and FIG. 4). On one hand, between the vicinities in the middle of the rear links 232, 232, an end portion restricting rod 232c is suspended in the width direction. The torsion coil springs 241, 241 are arranged in such a manner that one-side ends 241b, 241b are individually engaged in a rear portion 245a1 of the adjustment plate 245a, and rear portions of the other ends 241c, 241c are engaged in the end portion restricting rod 232c of the rear links 232, 232. Hence, when the rear links 232, 232 perform rotational movement centered at the lower portions 232a, 232a, the engagement of the one-side ends 241b, 241b of the torsion coil springs 241, 241 in the rear portion 245a1 of the adjustment plate 245a imparts force in a deformation direction, and causes pressing force to act on the other ends 241c, 241c from behind them, and thereby a predetermined elastic force is exhibited. Incidentally, a cover covering the adjustment plate 245a is indicated by a reference sign 245c.

Further, the elastic force of the torsion coil springs 241, 241 can be adjusted by the second elastic force adjusting member 245 attached to the front frame 201 of the seat support frame 200. The second elastic force adjusting member 245 has the aforesaid adjustment plate 245a and an adjustment dial 245b. The adjustment dial 245b is rotated to thereby move the adjustment plate 245a forward and rearward. Accordingly, when the adjustment plate 245a is moved forward and rearward by rotating the adjustment dial 245b, the one-side ends 241b, 241b of the torsion coil springs 241, 241 engaged in the rear portion 245a1 thereof displace the torsion coil springs 241, 241 in a direction of reducing their diameter or enlarging their diameter, thereby adjusting the elastic force of the torsion coil springs 241, 241. By adjusting the elastic force of the torsion coil springs 241, 241, natural frequencies in the front-rear direction of the second link mechanism 230 and the seat support frame 200 are determined.

Further, the second elastic force adjusting member 245 can adjust the elastic force of the torsion coil springs 241, 241 independently of the above-described first elastic force adjusting member 125. Accordingly, adjusting the elastic force of the up-down direction spring mechanism 140 by using the above-described first elastic force adjusting member 125 and the elastic force of the front-rear direction spring mechanism 240 by using the second elastic force adjusting member 245 respectively allows, between the first link mechanism 130 and the second link mechanism 230, an adjustment of a phase difference in movement between the two, thereby allowing an adjustment of a natural frequency in the up-down direction of the entire seat suspension mechanism 1. Consequently, according to this embodiment, a vibration absorption characteristic and an impact absorption characteristic against input vibrations in the up-down direction can be adjusted more efficiently by this adjustment of the phase difference.

Between the intermediate frame 300 and the seat support frame 200, in this embodiment, a second damper 260 is provided between an attachment bracket 330 provided to project upward close to the rear portion of the intermediate frame 300 and an attachment bracket 250 close to the front portion of the seat support frame 200 (refer to FIG. 4). The second damper 260 performs the function of preventing bottoming when impact force is input, and is not essential when only the damping force of the above-described first damper 150 can respond to the impact force, but providing the second damper 260 makes it possible to exhibit a higher damping force as the entire seat suspension mechanism 1. The second damper 260 is a telescopic one having a cylinder 261 and a piston which is coupled to a piston rod 263 and moves in the cylinder 261 similarly to the above-described first damper 150, and the one having the structure illustrated in FIG. 9 and FIG. 10 is preferably used. In this case, at the time of the aforesaid normal vibration input, that is, in this embodiment, as illustrated in FIG. 11, in a case where the second link mechanism 230 is displaced backward in the range from 7.4 degrees to 36 degrees in reference to the vertical plane Y, the free running zone where the damping force does not act is preferably set to respond to the case. This makes it possible to exhibit the vibration absorption characteristic efficiently through the front-rear direction spring mechanism 240 at the time of the normal vibration input. That is, in this embodiment, forward and rearward vibrations can be absorbed efficiently by the front-rear direction spring mechanism 240. Accordingly, it is suitable for suppressing soft feeling in the front-rear direction to be produced at 2 to 3 Hz, visceral resonance caused by acceleration in the front-rear direction in the vicinity of 8 to 10 Hz, and a slap from a seat back (the so-called back slap) in the vicinity of 20 Hz.

According to this embodiment, a seated person adjusts the elastic force of the up-down direction spring mechanism 140 and sets the intermediate frame 300 to be at the neutral position (balanced point) in the up-down displacement range by using the first elastic force adjusting member 125. Next, he/she adjusts the elastic force of the front-rear direction spring mechanism 240 by using the second elastic force adjusting member 245 to thereby adjust ease of a front-rear direction movement, that is, spring feeling (relatively stiff spring feeling, relatively soft spring feeling) exhibited by the torsion coil springs 241, 241.

A position of "balanced point" illustrated in FIG. 11 indicates a position of the intermediate frame 300 and the seat support frame 200 when the intermediate frame 300 is set to be at the neutral position in the up-down displacement range in a static seating state. At this position, when a vibration input occurs in the front-rear direction, vibrations are absorbed by displacement to positions illustrated by "front direction" and "rear direction" in FIG. 11.

Meanwhile, when up-down direction vibrations cause displacement in a topping direction, the intermediate frame 300 is displaced from the position of "balanced point" to an upper portion which is a position indicated with solid lines as illustrated in FIG. 11. Further, when an impact force equal to or more than a predetermined force is input, the intermediate frame 300 is displaced in a bottoming direction to a position indicated with solid lines in FIG. 12. As illustrated in FIG. 12, even when the intermediate frame 300 is located at the lowermost end, the elastic force of the torsion coil springs 241, 241 of the front-rear direction spring mechanism 240 acts on the second link mechanism 230, thereby allowing a contribution to a reduction in bottoming feeling to a seated person.

Note that between at least either the front links 231, 231 or the rear links 232, 232, which constitute the second link mechanism 230, between connection center points with the seat support frame 200, a configuration to suspend a torsion bar (not illustrated) is preferred. For example, the attachment shaft 205 is suspended between the rear links 232, 232, and the attachment shaft 205 is formed of a pipe, and the torsion bar is disposed to be inserted through the pipe. Hence, elastic force to separate the seat support frame 200 from the intermediate frame 300 in the up-down direction is exhibited, thereby allowing further enhancement of the function of preventing bottoming.

Figure 13:
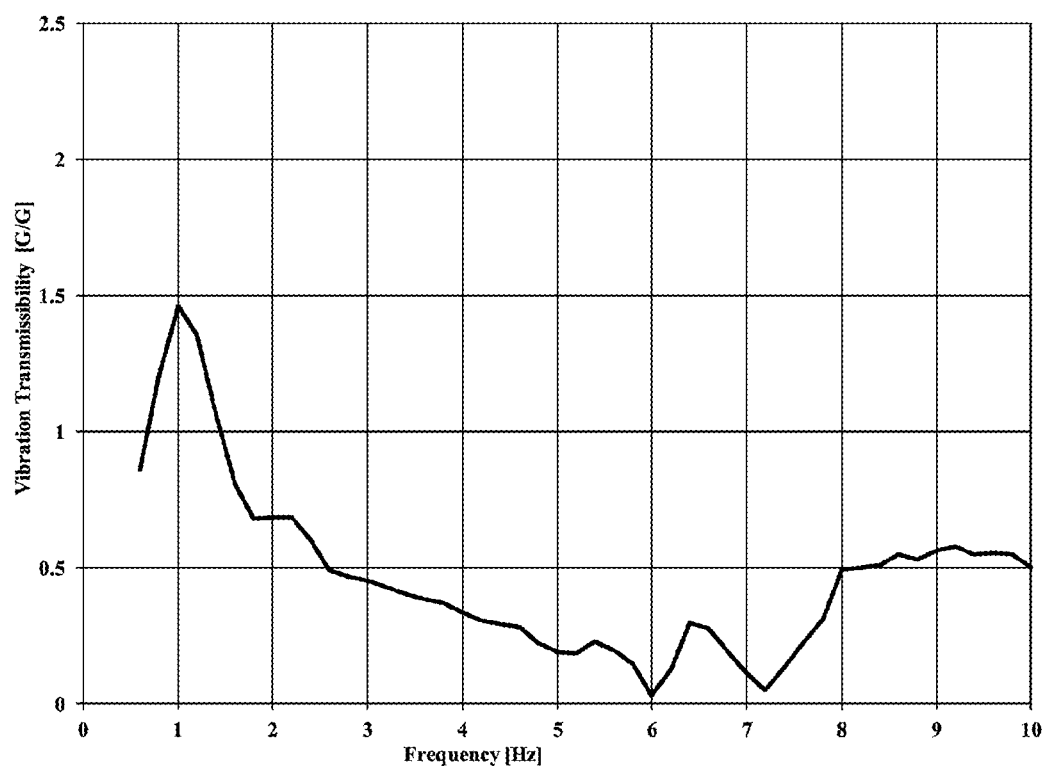
FIG. 13 is a chart illustrating a vibration transmissibility in a vibration test performed on the seat suspension mechanism of the above embodiment.

FIG. 13 illustrates the result of the vibration test performed by seating a subject with a weight of 65 kg on the seat suspension mechanism 1 of this embodiment illustrated in FIG. 1 to FIG. 12. The vibration test was performed by the excitation according to a standard for the input spectral class EM7 "compact dumper" defined in JIS A 8304:2001 "Earth moving machinery-Laboratory evaluation of operator seat vibration" based on ISO 7096:2000. Specifically, the excitation was performed under a 3.24 Hz dominant frequency and a 5.56 $(m/s^2)^2/Hz$ maximum value of PSD. As a vibrator, a 6-axis vibrator manufactured by DELTA TOOLING CO., LTD. was used, and on a vibration table of the vibrator, the seat suspension mechanism 1 in which a seat was attached on the seat support frame 200 was set, and the subject was seated on the seat.

According to FIG. 13, a resonant frequency in EM7 was 1.0 Hz, and a gain at a resonance peak was about 1.45. Further, regarding EM7 to which the largest amplitude of vibration of an excitation waveform makes it difficult to apply in the standard of ISO 7096:2000, a gain was less than 0.5 at 3.24 Hz at a peak of acceleration of the excitation waveform. Consequently, the seat suspension mechanism 1 of this embodiment can be said to have a high vibration damping function.

The invention claimed is:

1. A seat suspension mechanism disposed between a vehicle body structure and a seat, the seat suspension mechanism comprising:
   a base frame attached on a vehicle body structure side;
   a seat support frame attached on a seat side;
   an intermediate frame located between the base frame and the seat support frame;
   a first link mechanism supporting the intermediate frame with respect to the base frame;
   a second link mechanism supporting the seat support frame with respect to the intermediate frame;
   an up-down direction spring mechanism which elastically biases the intermediate frame with respect to the base frame; and
   a first damper suspended between the base frame and the intermediate frame,
   the first link mechanism and the second link mechanism being provided in a positional relationship in which straight lines connecting connection center points of links connecting the intermediate frame and the seat support frame in the second link mechanism are closer to a vertical to a front-rear direction of a vehicle body at a balanced point than straight lines connecting connection center points of links connecting the base frame and the intermediate frame in the first link mechanism, and
   a front-rear direction spring mechanism which exhibits elastic force in accordance with movement of the links of the second link mechanism being provided.

2. The seat suspension mechanism according to claim 1, further comprising: a first elastic force adjusting member which adjusts elastic force of the up-down direction spring mechanism; and a second elastic force adjusting member which adjusts elastic force of the front-rear direction spring mechanism, wherein it is possible to separately adjust the elastic force of the up-down direction spring function and the elastic force of the front-rear direction spring function.

3. The seat suspension mechanism according to claim 1, further comprising a second damper which is suspended between the intermediate frame and the seat support frame and whose damping force acts when an impact force equal to or more than a predetermined force is input.

4. The seat suspension mechanism according to claim 1, wherein the front-rear direction spring mechanism uses torsion coil springs in which one-side ends are engaged on the seat support frame side and the other ends are engaged on the second link mechanism side, respectively, and twisted in accordance with the movement of the links of the second link mechanism.

5. The seat suspension mechanism according to claim 4, wherein in the links forming the second link mechanism, between connection center points with the seat support frame between a pair of the links spaced in a width direction on at least either a front side or a rear side, a torsion bar for preventing bottoming, which exhibits elastic force to separate the seat support frame from the intermediate frame in an up-down direction, is further provided.

6. The seat suspension mechanism according to claim 1, wherein the up-down direction spring mechanism comprises:
a linear spring which exhibits a linear spring characteristic of exhibiting elastic force to separate the intermediate frame from the base frame in the up-down direction; and
a magnetic spring which includes stationary magnets and a movable magnet whose relative position to the stationary magnets is displaced in accordance with up-down movement of the intermediate frame relative to the base frame, and exhibits a nonlinear spring characteristic that a spring constant is changed depending on the relative position of the stationary magnets and the movable magnet, and
wherein a spring characteristic of combining the linear spring and the magnetic spring includes a characteristic of being a constant load when the intermediate frame is located in a predetermined up-down movement range including a balanced point.

7. The seat suspension mechanism according to claim 6, wherein the up-down direction spring mechanism further comprises:
an auxiliary spring mechanism which includes, between the base frame and the intermediate frame, a pantograph link and a tensile coil spring suspended on the pantograph link, and exhibits a spring characteristic of biasing the intermediate frame downward when the intermediate frame is located in the predetermined up-down movement range including the balanced point, and
wherein a spring characteristic of further combining the auxiliary spring mechanism with the linear spring and the magnetic spring includes the characteristic of being the constant load when the intermediate frame is located in the predetermined up-down movement range including the balanced point.

* * * * *